United States Patent
Katakura et al.

[11] Patent Number: 5,864,253
[45] Date of Patent: Jan. 26, 1999

[54] HIGH-SPEED SIGNAL TRANSMISSION CIRCUIT WITH REDUCED ELECTROMAGNETIC INTERFERENCE

[75] Inventors: Shinichi Katakura; Akira Nagumo, both of Tokyo, Japan

[73] Assignee: Oki Data Corporation, Tokyo, Japan

[21] Appl. No.: 761,583

[22] Filed: Dec. 6, 1996

[30] Foreign Application Priority Data

Dec. 27, 1995 [JP] Japan .................................. 7-353316

[51] Int. Cl.$^6$ .................................................. H03K 1/04
[52] U.S. Cl. .................... 327/297; 327/108; 327/404; 326/96; 377/80
[58] Field of Search ............................. 327/108–112, 293, 327/295, 297, 403, 404; 326/93, 96; 377/77–81

[56] References Cited

U.S. PATENT DOCUMENTS

5,150,068  9/1992  Kawashima et al. ................... 327/145
5,528,187  6/1996  Sato et al. ................................ 327/292

*Primary Examiner*—Kenneth B. Wells
*Attorney, Agent, or Firm*—Panitch Schwarze Jacobs & Nadel, P.C.

[57]  ABSTRACT

Data are transmitted from a control device through an interface cable to a set of driver devices in synchronization with an external clock signal, or a complementary pair of external clock signals. The signal line or lines carrying the external clock signal or signals are terminated at both ends by resistors with resistance values matching the characteristic impedance of the interface cable. Each driver device has a comparator that compares the external clock signal with a regulated reference voltage, or compares the two complementary external clock signals with each other, and thereby generates an internal clock signal. The driver devices receive the data in synchronization with these internal clock signals.

25 Claims, 9 Drawing Sheets

FIG. 9

HIGH-SPEED SIGNAL TRANSMISSION CIRCUIT WITH REDUCED ELECTROMAGNETIC INTERFERENCE

BACKGROUND OF THE INVENTION

The present invention relates to a circuit for transferring data from a control device to a plurality of driver devices disposed in, for example, the printing head of a printer.

The driver devices in question typically have shift registers through which the data are transferred in synchronization with a clock signal. The clock signal is conventionally supplied to the first driver device through an interface cable, then propagated from one driver device to the next, with amplification and reshaping by buffer circuits in each driver device.

Due to the increasing printing speeds of recent printers, the conventional scheme has begun to encounter a number of problems. Briefly, the transfer of a high-frequency clock signal through the interface cable generates unwanted electromagnetic interference (EMI); propagation delays in the buffer circuits become a limiting factor on printing speed; and the clock signal becomes increasingly susceptible to disruption by switching noise. These problems will be described in more detail later.

SUMMARY OF THE INVENTION

It is accordingly an object of the present invention to reduce electromagnetic interference in the transfer of data.

Another object of the invention is to enable high-speed transfer of data to a plurality of cascaded driver devices.

A further object is to enable data to be transferred reliably to a plurality of driver devices while the driver devices are switching driven elements on and off.

According to a first aspect of the invention, a control device has a clock generator that generates an external clock signal, which is transmitted through an interface cable and supplied in parallel to a plurality of driver devices. The signal line carrying the external clock signal through the interface cable is terminated at both ends by resistors with resistance values matching the characteristic impedance of the interface cable. A voltage regulator supplies a reference voltage to the driver devices. Each driver device has a comparator that compares the external clock signal with the reference voltage to generate an internal clock signal. The driver device uses the internal clock signal for receiving data.

According to a second aspect of the invention, a control device has a clock generator that generates a pair of complementary external clock signals, which are transmitted through an interface cable and supplied in parallel to a plurality of driver devices. The signal lines carrying these complementary external clock signals through the interface cable are terminated at both ends by resistors with resistance values matching the characteristic impedance of the interface cable. Each driver device has a comparator that compares the two complementary external clock signals to generate an internal clock signal. The driver device uses the internal clock signal for receiving data.

DETAILED DESCRIPTION OF THE INVENTION

Embodiments of the invention will be described with reference to the attached illustrative drawings. First, however, a more detailed description will be given of one setting in which the invention can be usefully practiced, and of the above-mentioned problems of the prior art.

Figure 1:
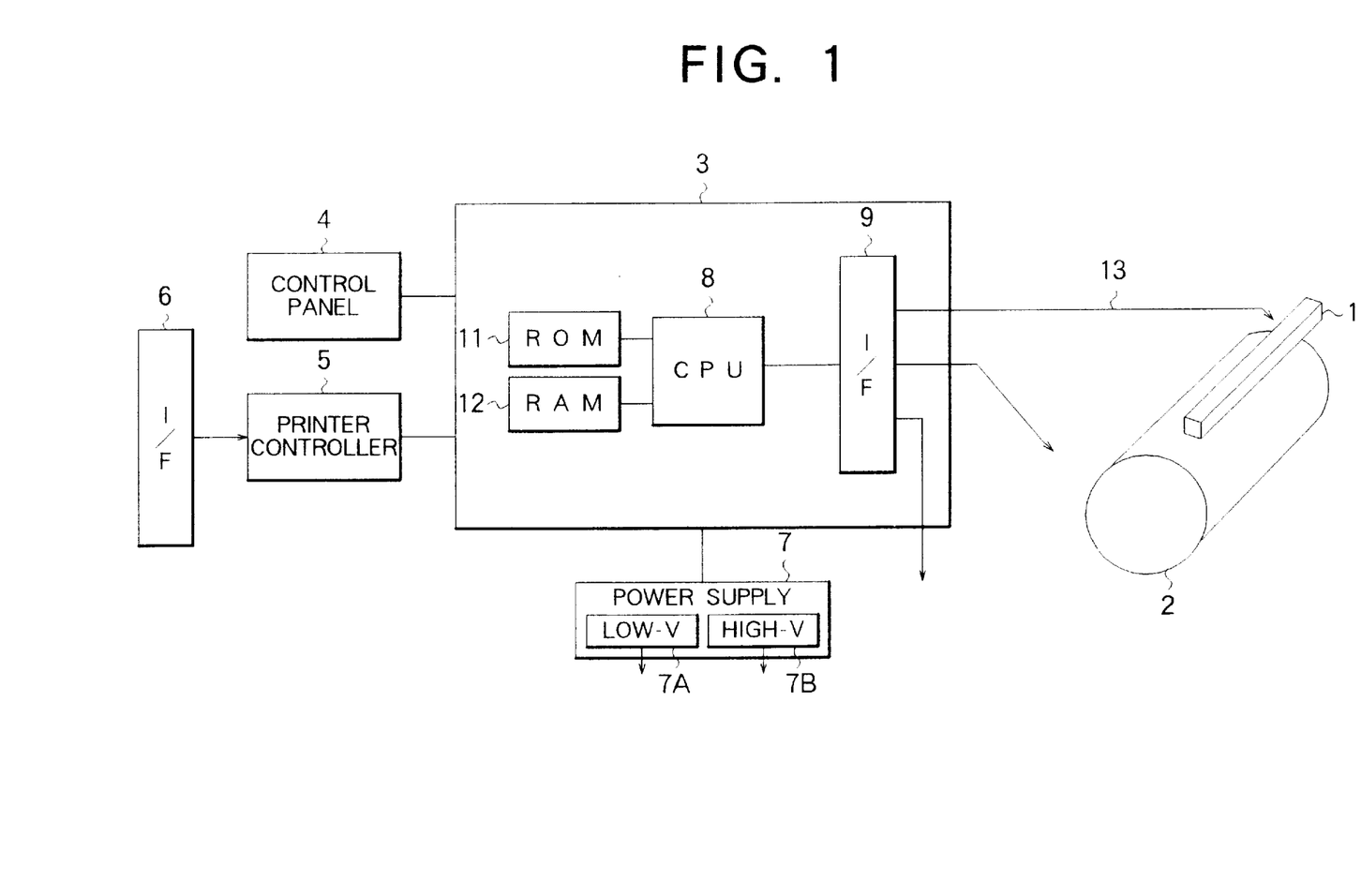
FIG. 1 is a block diagram of an electrophotographic printer with a printing head employing an array of light-emitting diodes.

Referring to FIG. 1, this setting is that of an electrophotographic printer having a print engine in which a light-emitting-diode (LED) printing head 1 illuminates a photosensitive drum 2. The print engine is controlled by a print engine controller 3 that receives commands from a control panel 4, and receives commands and data from a printer controller 5. The printer controller 5 is coupled through an interface (I/F) circuit 6 to an external device such as a computer (not visible). The printer is powered by a power supply 7 having a low-voltage power source 7A and a high-voltage power source 7B. The print engine controller 3 comprises a central processing unit (CPU) 8 such as a microprocessor, a plurality of input-output (I/O) ports 9, a read-only memory (ROM) 10 that stores programs executed by the CPU 8, and a random-access memory (RAM) 12 that provides a working area for reading and writing data. At least one of the I/O ports 9 is connected to the printing head 1 through an interface cable 13.

In response to commands and data received via the interface circuit 6, the printer controller 5 prepares bit-mapped data, which are supplied to the print engine controller 3. The low-voltage power source 7A in the power supply 7 supplies a voltage VDD such as five volts (5 V) to the print engine controller 3 and to other logic and control circuits in the printer. The high-voltage power source 7B supplies high voltages needed by various units employed in the electrophotographic printing process, not explicitly shown in FIG. 1.

Figure 2:
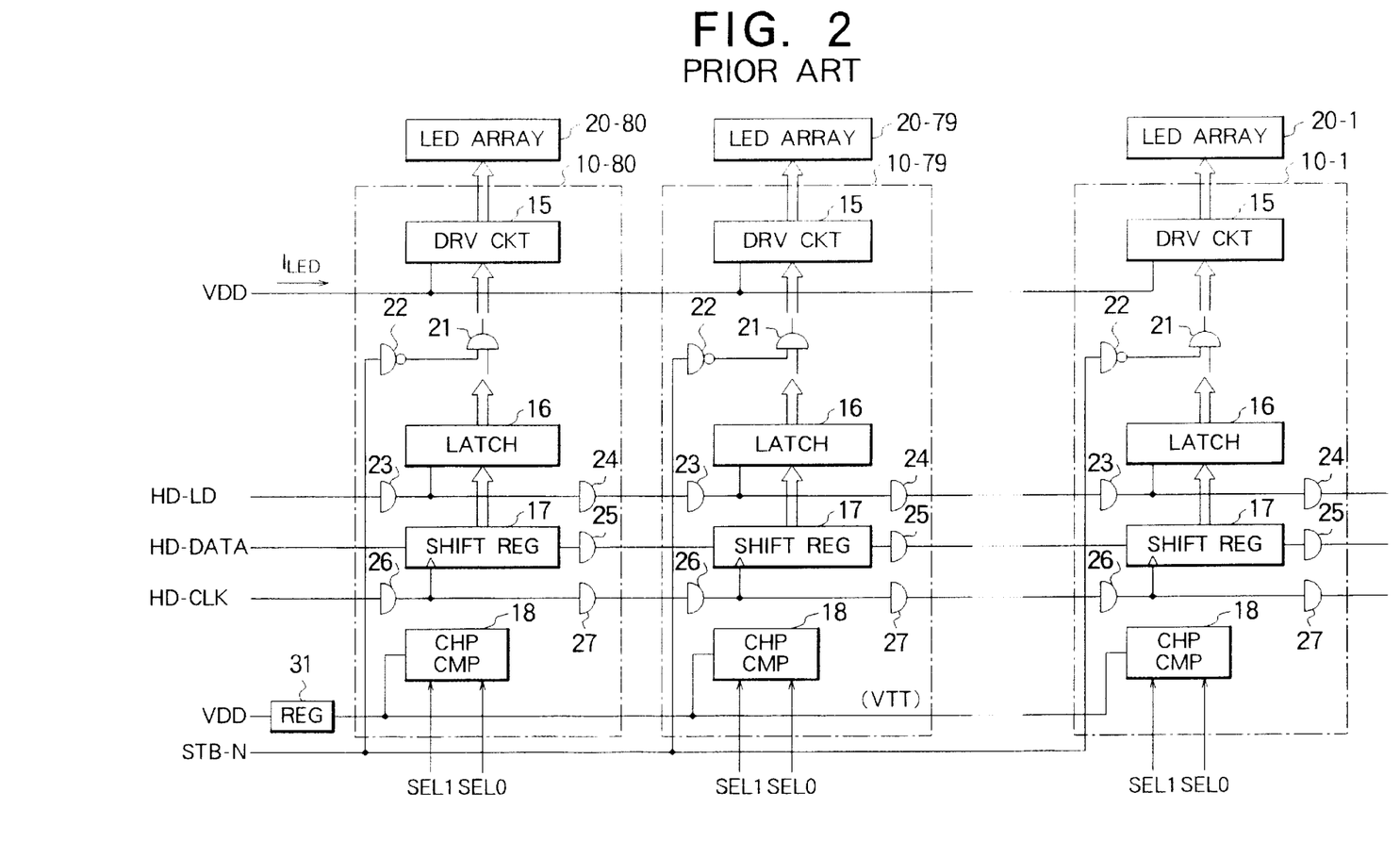
FIG. 2 is a block diagram of a plurality of driver devices of a type conventionally employed in the printing head in FIG. 1.

FIG. 2 shows a block diagram of a conventional printing head 1, which comprises eighty driver devices 10, numbered 10-1 to 10-80 in the drawing, that drive eighty corresponding LED array devices 20, numbered 20-1 to 20-80. Each LED array device has 20, for example, a linear array of sixty-four light-emitting diodes; the eighty LED array devices 20 then provide a total linear array of five thousand one hundred twenty (5120) light-emitting diodes, a number suitable for printing at six hundred dots per inch (600 DPI).

The driver devices 10-1 to 10-80 are integrated circuits having identical configurations, each comprising a LED driving circuit (DRV CKT) 15, a latch circuit 16, a shift register 17, and a chip compensation circuit (CHP CMP) 18. Each shift register 17 has sixty-four cascaded flip-flop stages and stores sixty-four bits of data. These sixty-four bits are transferred in parallel to the latch circuit 16, and latched in synchronization with a load signal HD-LD. The latched data are supplied in parallel through sixty-four two-input AND gates 21, of which only one AND gate is shown in the drawing, to the LED driving circuit 15, which supplies current to the light-emitting diodes in the corresponding LED array device 20. The amount of current supplied is adjusted by the chip compensation circuit 18 to compensate for differences in electrical characteristics between different driver devices 10 and different LED array devices 20.

The two-input AND gates 21 are coupled through an inverter 22 to a strobe signal line STB-N. The output of each AND gate 21 goes high only when the strobe signal STB-N is low and the corresponding data bit latched in the latch circuit 16 is a logic one. Current is supplied to a particular light-emitting diode only when the output of the corresponding AND gate 21 is high. The supplied current is obtained from the low-voltage power source 7A in FIG. 1, and is sent to the printing head 1 by the print engine controller 3.

The load signal HD-LD propagates from one driver device 10 to the next through buffer circuits 23 and 24 in each driver device. The data to be printed are supplied on a HD-DATA signal line to the shift register 17 in driver device 10-80, and propagate from one shift register 17 to the next through buffer circuits 25. The data are shifted through the shift registers 17 in synchronization with a clock signal HD-CLK. Thus the driver circuits 10 are cascaded so as to operate as a single combined shift register, with associated latch, driving, and compensation circuits.

In the prior art, the clock signal HD-CLK propagates from one driver device 10 to the next through buffer circuits 26 and 27 in each driver device 10. This arrangement is modified in the present invention, as will be described later.

The chip compensation circuits 18 receive a regulated voltage VTT from a voltage regulator 31. The regulated voltage VTT is generated from VDD, but is free of the LED switching noise (described later) present in VDD. Each chip compensation circuit also receives two selection signals SEL0 and SEL1, and can adjust the current fed to the light-emitting diodes in four levels responsive to the combination of logic levels of SEL0 and SEL1.

Figure 3:
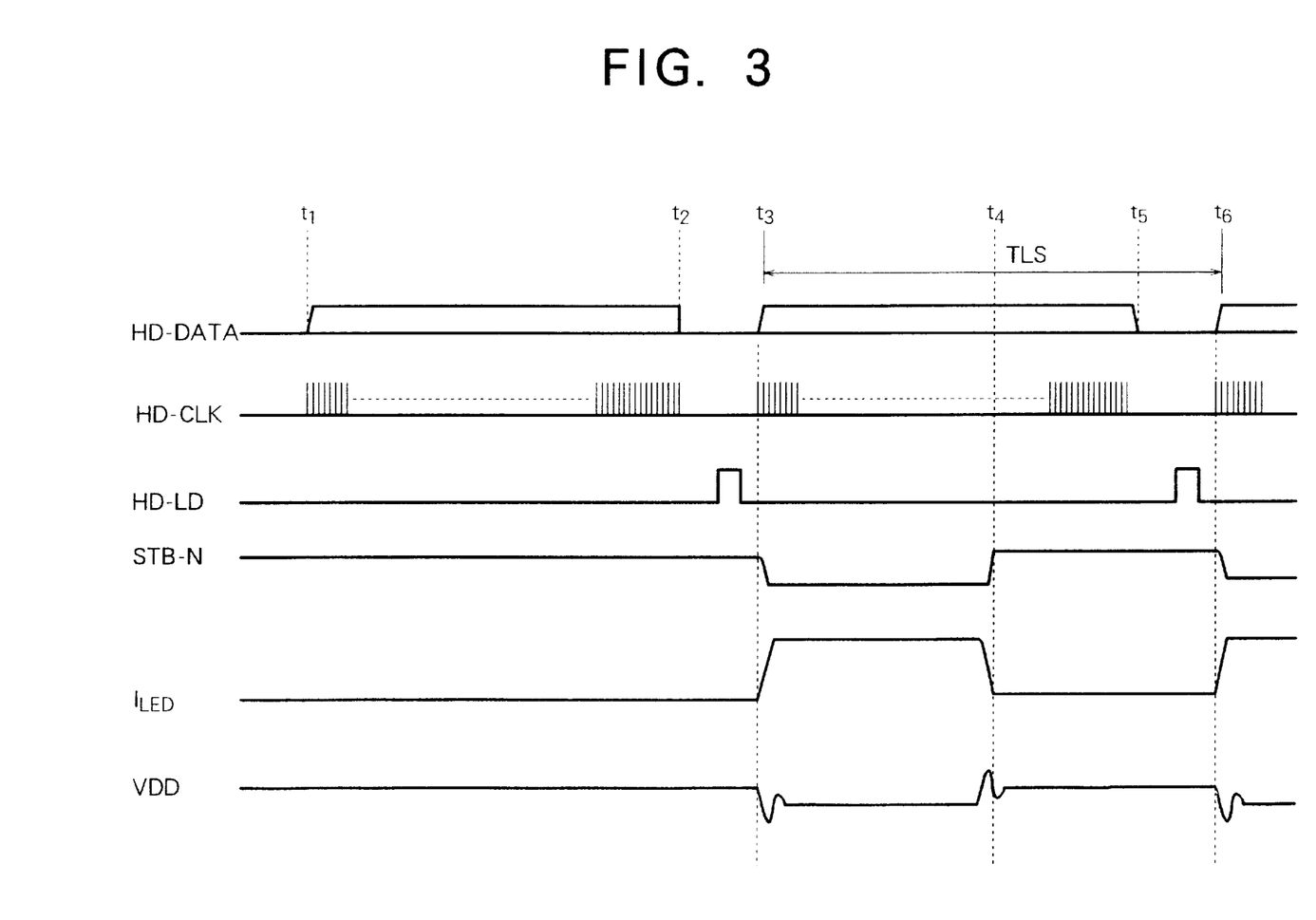
FIG. 3 is a timing diagram illustrating the transfer of data to the printing head.

FIG. 3 illustrates the timing of the signals shown in FIG. 2. To print one line of dots, the print engine controller 3 supplies dot data (HD-DATA) and clock pulses (HD-CLK) during the interval of time from $t_1$ to $t_2$. Five-thousand one hundred twenty bits of data are shifted into the shift registers 17 by a like number of clock pulses during this interval. Next a load pulse (HD-LD) is supplied, causing the data to be latched in the latch circuits 16 in the driver devices.

At time $t_3$, more data and clock pulses are supplied, and the shifting of the dot data for the next dot line into the shift registers 17 begins. At the same time, the strobe signal (STB-N) is driven low, causing the data already latched in the latch circuits 16 to be printed. The simultaneous driving of a large number of light-emitting diodes draws considerable current ($I_{LED}$). If each light-emitting diode draws three milliamperes (3 mA), for example, and all light-emitting diode are switched on at once, then $I_{LED}$ is approximately 15.4 amperes (15.4 A). Due to the high current drain, the supplied voltage VDD dips sharply at time $t_3$ before settling to a constant value slightly lower than the normal VDD value.

At time $t_4$ the strobe signal (STB-N) is driven high, shutting off the supply of current ($I_{LED}$) to the light-emitting diodes, and causing another transient disturbance in the VDD level. The output of clock pulses (HD-CLK) and shifting of data (HD-DATA) continue during this disturbance. The transient disturbances at times $t_3$ and $t_4$ constitute the LED switching noise mentioned earlier.

The shifting of data for the next line ends at time $t_5$, after which another load pulse (HD-LD) loads these data into the latch circuits 16. The printing of these latched data and the shifting of data for another line into the shift registers begin at time $t_6$. If the printer prints at a rate of twenty-four pages per minute, a rate not unusual in recent electrophotographic printers, then dot lines must be printed at a rate of six inches per second, so the interval TLS from time $t_3$ to time $t_6$ is substantially 278 μms, calculated as follows:

$$TLS = (1\ s)/[(600\ DPI) \times (6\ inches)]$$

To transfer five thousand one hundred twenty bits of data in a time shorter than TLS, the cycle time TCLK of the clock signal HD-CLK must satisfy the following condition:

$$TCLK < 278\ \mu s/5120$$

Thus the clock cycle time must be less than fifty-four nanoseconds (TCLK<54 ns), and the clock frequency must exceed about 18.5 megahertz (18.5 MHz).

Figure 4:
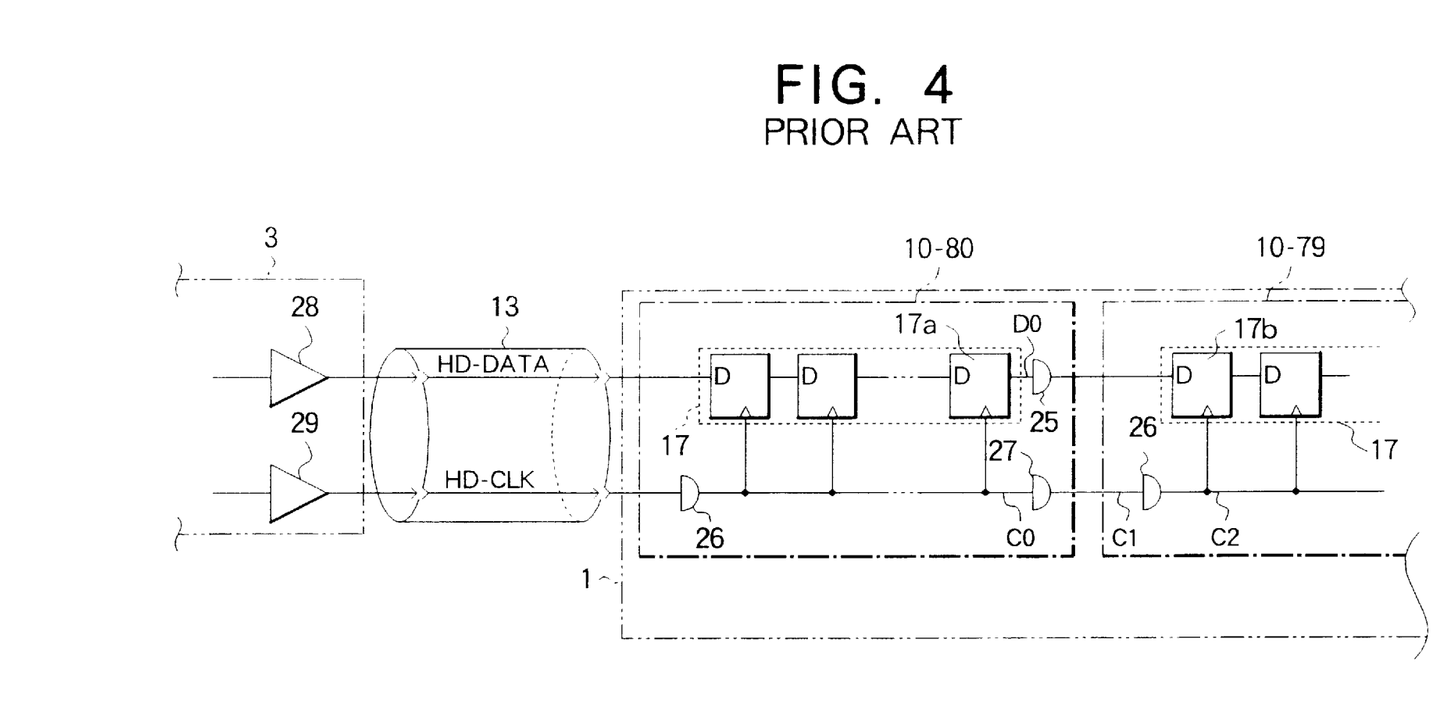
FIG. 4 is a schematic diagram illustrating the circuits conventionally associated with the data and clock signal lines.

FIG. 4 is an enlarged schematic diagram of the circuits conventionally used to transfer clock signals and data from the print engine controller 3 to the driver devices 10, showing the individual D-type flip-flops 17a, 17b, etc. that constitute the shift registers 17, and the buffers 25, 26, and 27 that propagate the data and clock signals. The interface cable 13 is a flexible flat cable or ribbon cable with separate conductors for HD-DATA, HD-CLK, and other signals. The printing head 1 is attached to the top cover of the printer. The interface cable 13 has enough extra length to permit the top cover to be opened for correction of paper jams and for maintenance work.

To transmit signals at high speed through the long interface cable 13, the print engine controller 3 has complementary metal-oxide-semiconductor (CMOS) buffer circuits 28 and 29 with high driving capability. The output levels of these buffer circuits 28 and 29 are VDD (e.g. 5 V) and the ground level (0 V), so HD-CLK has an amplitude equal to VDD.

When the clock signal HD-CLK is transmitted through the long interface cable 13, the cable acts as an antenna, radiating high-frequency electromagnetic noise that can interfere with nearby radio, television, or wireless telephone reception. Noise is radiated not only at the clock frequency (>18.5 MHz), but at still higher harmonic frequencies generated by the rising and falling transitions of the clock signal. To reduce the troublesome high-frequency noise, the HD-CLK waveform is conventionally smoothed by increasing the rise time and fall time.

Figure 5:
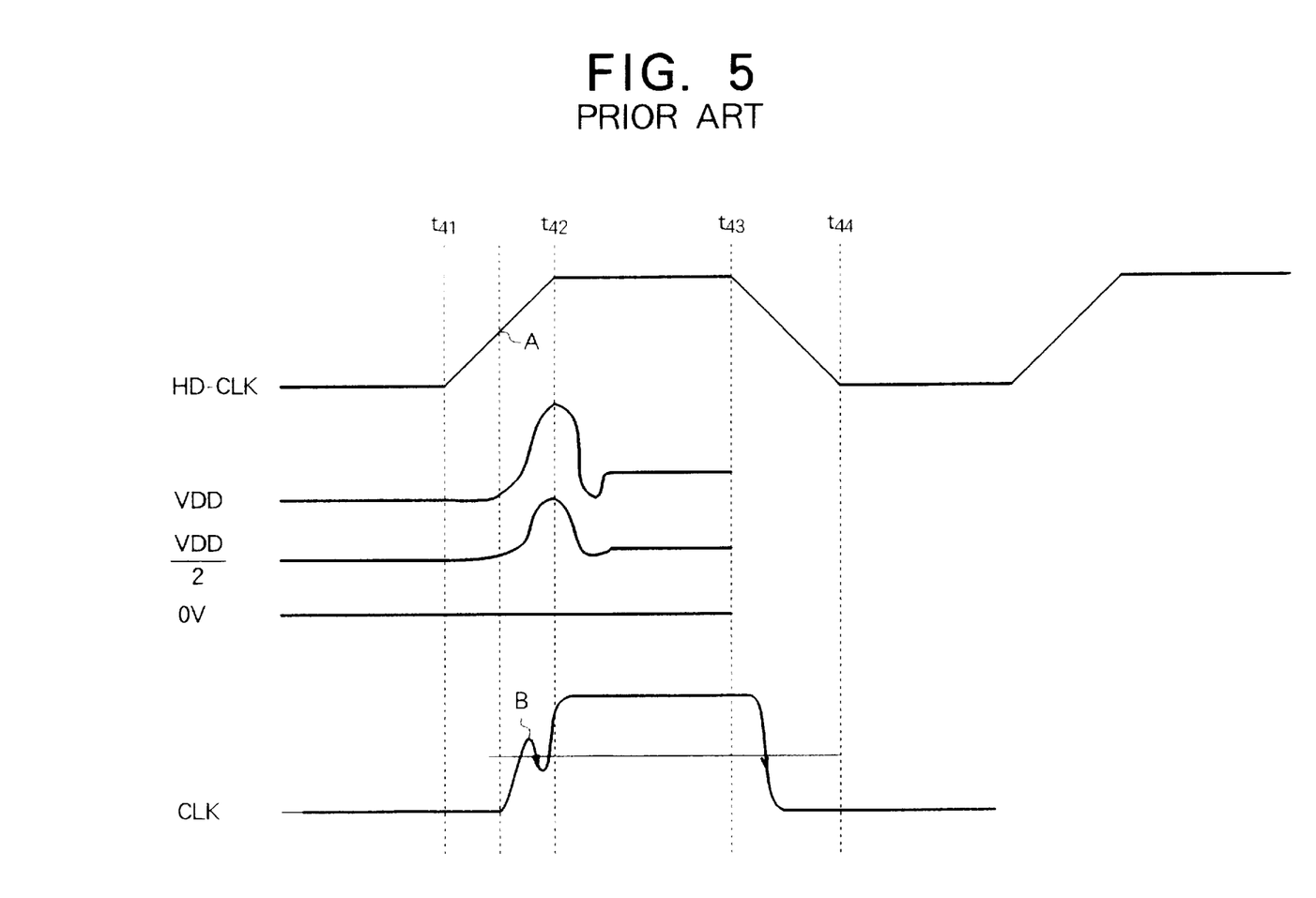
FIG. 5 is a timing diagram illustrating a problem that occurs with the conventional circuits in FIG. 4.

FIG. 5 shows an example of waveforms of the HD-CLK signal received by the first buffer circuit 26 in driver device 10-80 and the clock signal (CLK) output by this buffer circuit 26 around time $t_4$ in FIG. 3. Due to the smoothing mentioned above, the received clock signal HD-CLK rises gradually in the interval from time $t_{41}$ to time $t_{42}$, and falls gradually in the interval from $t_{43}$ to $t_{44}$. Due to the LED switching noise shown in FIG. 3, VDD fluctuates around time $t_{42}$. The switching point of the buffer circuit 26 is substantially VDD/2, so the buffer output signal CLK begins to rise when HD-CLK reaches VDD/2 at point A. Since HD-CLK rises gradually, however, the transient fluctuation in VDD sends VDD/2 above HD-CLK again, causing the CLK waveform to fall back briefly at point B. The unwanted transition at B may cause the shift registers 17 in driver device 10-79 and the following driver devices to operate incorrectly.

The smoothing shown in FIG. 5 does not completely eliminate the problem of electromagnetic interference. Despite any amount of smoothing, electromagnetic interference will be radiated at the clock frequency, which already exceeds 18.5 MHz. Smoothing moreover reduces the maximum permissible clock rate, by shortening the high and low durations of the clock waveform, which must have at least a certain minimum length. (The high duration, for example, is the time from $t_{42}$ to $t_{43}$.)

Figure 6:
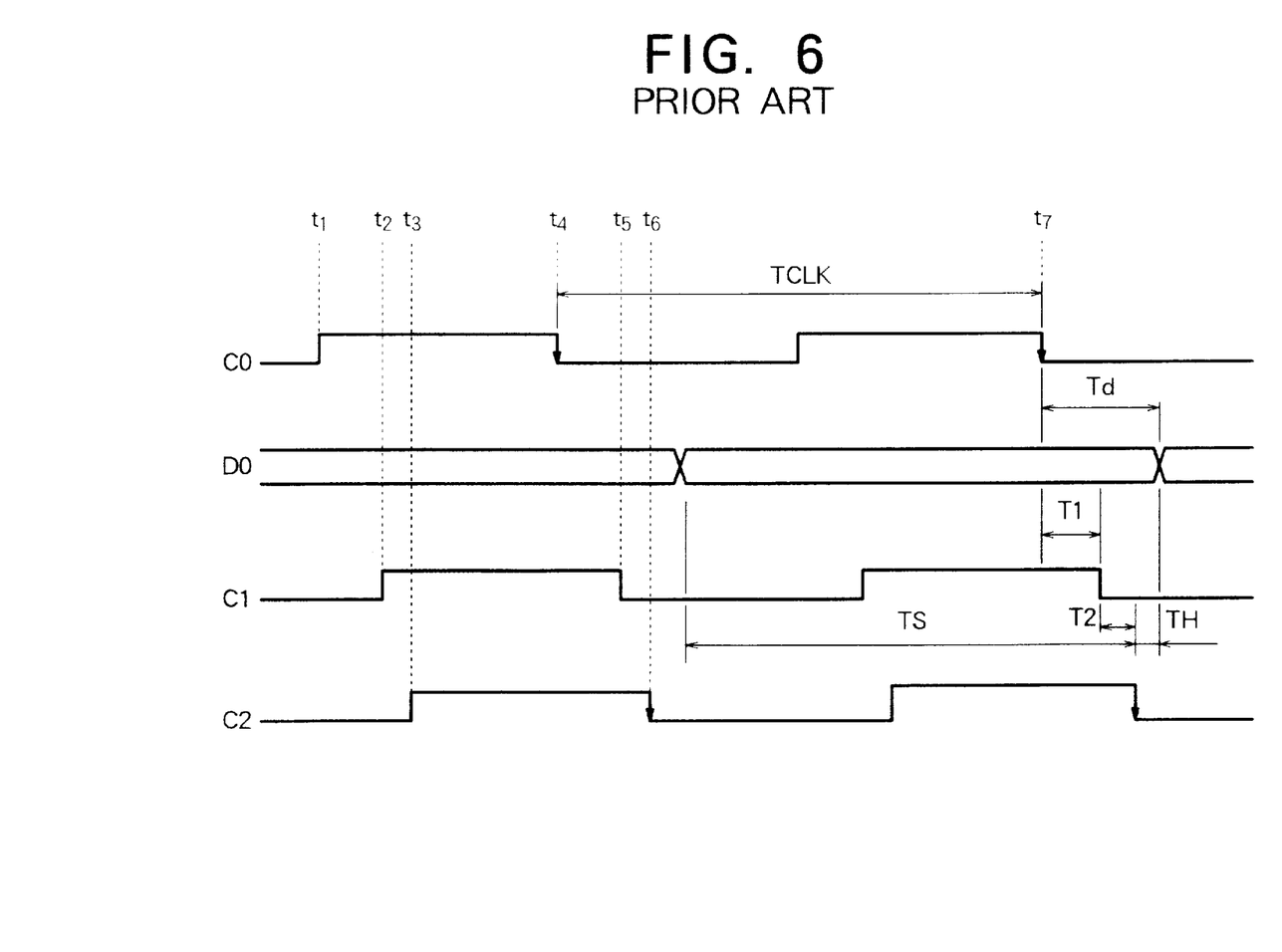
FIG. 6 is a timing diagram illustrating another problem that occurs with the conventional circuits in FIG. 4.

FIG. 6 illustrates a timing problem caused by propagation delays in the conventional clock transmission circuit. Clock waveforms C0, C1, and C2 and data waveform D0 are taken from the corresponding points in FIG. 4. Unsmoothed clock waveforms are shown, to illustrate the timing relationships more clearly, but the same problem occurs with smoothed clock waveforms.

Waveform C0 is supplied to the shift register 17 in driver device 10-80, while buffer circuit 26 in driver device 10-79 receives waveform C1, and the shift register 17 in driver device 10-79 receive waveform C2. The rising transition in waveform C0 at time $t_1$ produces rising transitions in waveforms C1 and C2 at times $t_2$ and $t_3$. The falling transition in waveform C0 at time $t_4$ produces falling transitions in waveforms C1 and C2 at times $t_5$ and $t_6$. Due to propagation delays in buffer circuits 26 and 27, and in the leads and signal lines interconnecting driver devices 10-80 and 10-79, the clock waveforms are skewed with respect to one another: waveform C1 is delayed by a time T1 with respect to waveform C0, and waveform C2 is delayed by a time T2 with respect to waveform C1.

Transitions in the data signal output by the last flip-flop 17a in driver device 10-80 are delayed by a certain amount Td with respect to clock waveform C0. These output transitions must occur during the relevant cycle of the clock signal C2 received by the first flip-flop 17b in driver device 10-79. This gives rise to set-up time (TS) and hold time (TH) requirements that can be defined in terms of delay times T1, T2, and Td and the clock cycle time TCLK as follows.

$$TS=TCLK+(T1+T2)-Td>0$$

$$TH=Td-(T1+T2)>0$$

To satisfy the hold-time (TH) requirement, the output delay Td must be large enough to exceed the sum of the propagation delays T1 and T2. The need for a large output delay Td in turn places a lower limit on the clock cycle time TCLK, hence an upper limit on the clock frequency.

Thus while failing to eliminate electromagnetic interference, the conventional data transmission circuit invites shift-register malfunctions and limits the maximum transmission rate.

Figure 7:
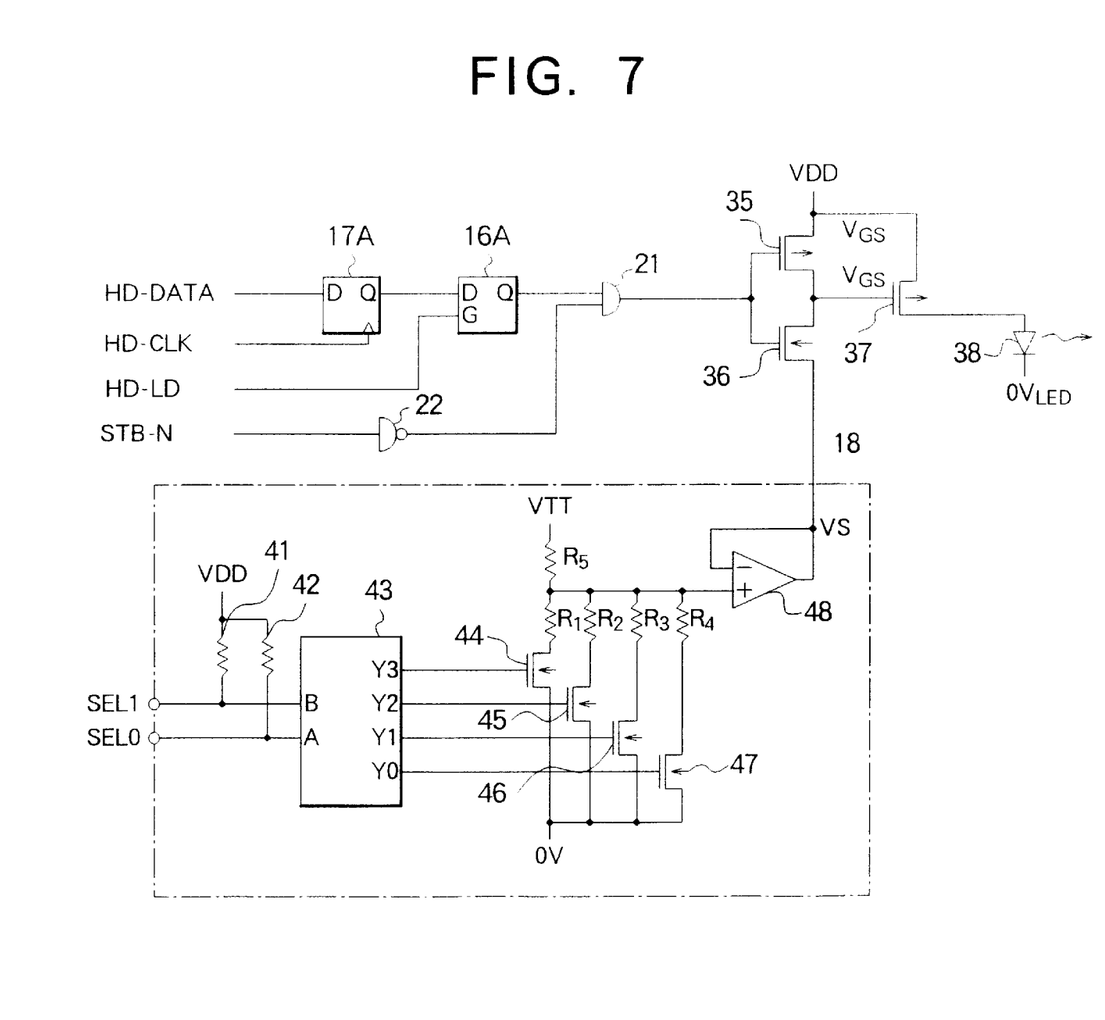
FIG. 7 is a schematic diagram illustrating the circuits that drive a light-emitting diode in the printing head in FIG. 1.

FIG. 8 shows the circuits involved in the driving of one light-emitting diode in the printing head 1. D-type flip-flops 16A and 17A represent one stage in the latch circuit 16 and shift register 17, respectively, in one of the driver devices 10. The AND gate 21 and inverter 22 are as illustrated in FIG. 2. The logic level output by AND gate 21 is supplied to the gate electrodes of a p-channel metal-oxide-semiconductor (PMOS) transistor 35 and an n-channel metal-oxide-semiconductor (NMOS) transistor 36, which are coupled in series between the power supply VDD and the chip compensation circuit 18. These transistors 35 and 36 operate as an inverter, the output of which drives the gate of another PMOS transistor 37, which feeds current from the power supply VDD to the anode of a light-emitting diode 38.

The cathodes of all of the light-emitting diodes in the printing head are coupled to a special common ground (0 $V_{LED}$), which is wired separately from the ground (0 V) of the driver circuits, so that ground bounce produced when the light-emitting diodes are switched on and off does not directly affect logic operations and shift operations in the driver devices.

In the chip compensation circuit 18, the SEL0 and SEL1 input signals are pulled up through resistors 41 and 42 to the high logic level (VDD) and supplied to a decoder 43. The four outputs Y0, Y1, Y2, and Y3 of the decoder 43 are supplied to the gate electrodes of respective NMOS transistors 44, 45, 46, and 47, which are coupled in parallel through respective resistors $R_1$, $R_2$, $R_3$, and $R_4$ to the non-inverting (+) input terminal of an operational amplifier 48, and to a further resistor $R_5$ to which the regulated voltage VTT is supplied. The inverting (−) input terminal and the output terminal of the operational amplifier 48 are coupled to the source electrode of NMOS transistor 36.

Responsive to the SEL0 and SEL1 logic levels, the decoder 43 turns on one of the transistors 44, 45, 46, and 47, causing the regulated voltage VTT to be divided by resistor $R_5$ and one of the four resistors $R_1$, $R_2$, $R_3$, and $R_4$, which have four different resistance values. The operational amplifier 48 outputs a voltage equal to the resulting divided voltage. When the light-emitting diode 38 is driven, this voltage is supplied through NMOS transistor 36 to the gate of PMOS transistor 38, so the gate-source voltage $V_{GS}$ of PMOS transistor 38, hence the current supplied to the light-emitting diode 38, can be adjusted in four steps responsive to the SEL0 and SEL1 inputs.

Sufficient information has now been given for the invention to be described. The description will be confined to the parts differing from the prior art.

Figure 8:
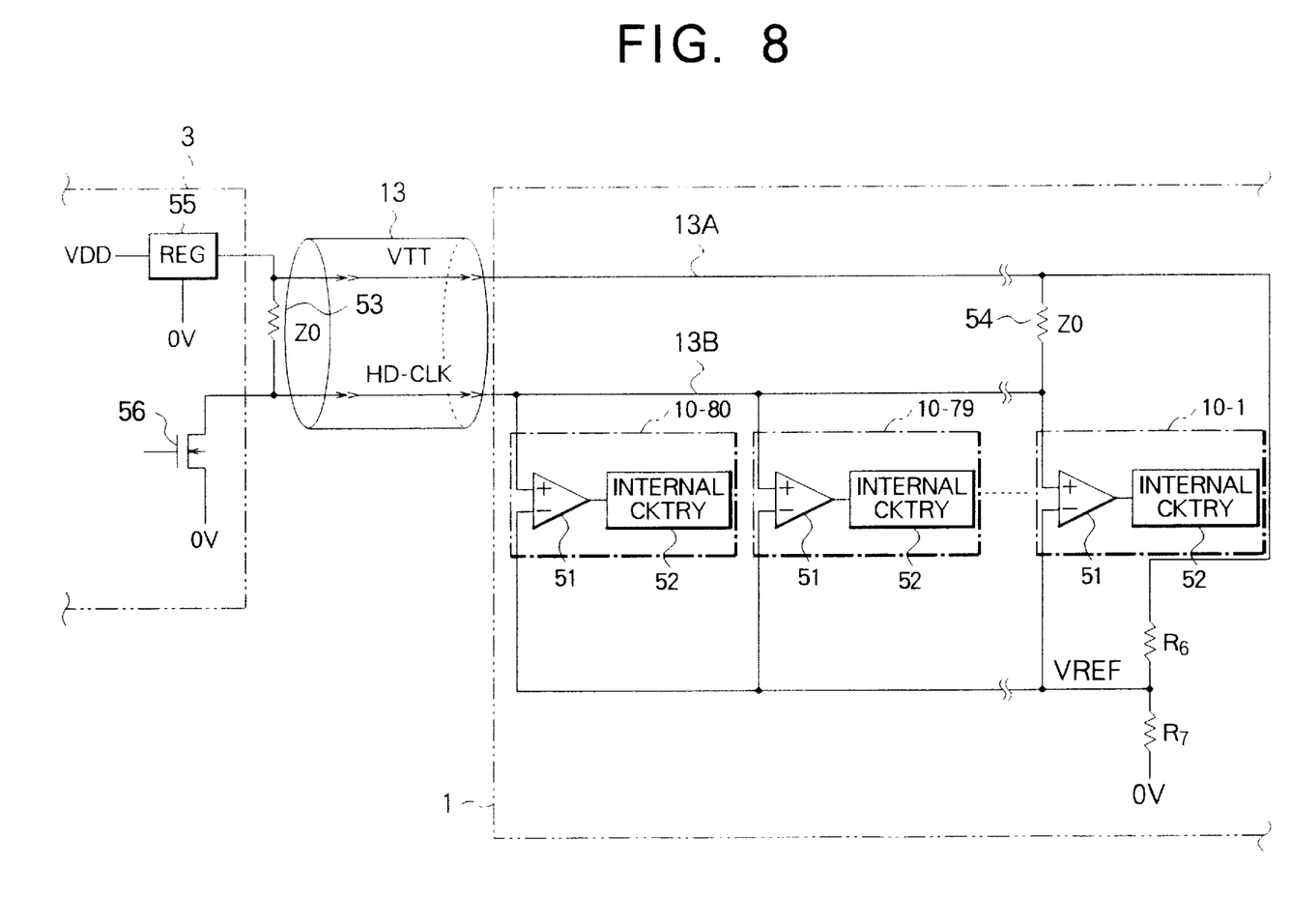
FIG. 8 is a schematic diagram illustrating a first embodiment of the invented signal transfer circuit.

Referring to FIG. 8, which shows part of the printing head 1 and print engine controller 3 in FIG. 1, according to the present invention, each driver device 10 has a comparator 51 that generates an internal clock signal from the external clock signal HD-CLK supplied to the printing head 1. The other circuits in each driver device 10, including the shift register, latch circuit, LED driving circuit, chip compensation circuit, logic circuits, and buffers, are indicated in FIG. 8 as a block of internal circuitry 52. The internal clock signal generated by the comparator 51 is employed for shifting data in the internal circuitry 52.

According to a first embodiment of the invention, the non-inverting (+) input terminal of each comparator 51 is coupled to the HD-CLK clock signal line 13B, and the inverting input terminal (−) is coupled to a reference voltage (VREF) signal line.

The interface cable 13 is a ribbon cable carrying the HD-CLK signal, the regulated voltage VTT, and other signals (such as HD-DATA, HD-LD, and STB-N) not explicitly shown in the drawing. Where the interface cable 13 is coupled to the print engine controller 3, the VTT and HD-CLK signal lines 13A and 13B are joined by a terminating resistor 53 having a resistance value matched to the characteristic impedance Z0 of the interface cable 13. The VTT and HD-CLK signal lines 13A and 13B are similarly terminated by a resistor 54, having the resistance value Z0, at the far end of the LED array, where the HD-CLK signal line 13B is coupled to the last driver device 10-1.

By matching the characteristic impedance of the interface cable 13, the terminating resistors 53 and 54 prevent reflection of the HD-CLK signal at the ends of the HD-CLK signal line 13B. These resistors 53 and 54 also pull up the HD-CLK signal line 13B to the regulated voltage VTT, which is generated from the supply voltage VDD by a voltage regulator 55 in the print engine controller 3. In this embodiment, VDD is 5 V and VTT is 1.2 V. The HD-CLK signal is output as an open-drain signal by an NMOS transistor 56 that acts as a clock generator, its gate electrode being driven at the desired clock frequency. The source electrode of this NMOS transistor 56 is coupled to ground (0 V), so the HD-CLK signal alternates between 0 V and VTT. Thus the HD-CLK waveform has an amplitude of VTT (1.2 V), instead of the conventional VDD (5 V).

VTT is also supplied to a voltage divider comprising a pair of resistors $R_6$ and $R_7$ with equal resistance values, which are coupled in series between the VTT signal line 13A and ground (0 V). This voltage divider creates the reference voltage VREF, which is accordingly equal to 0.6 V. The circuit configuration employed here is analogous to the well-known Gunning transceiver logic (GTL).

Next the operation of the first embodiment will be described.

In each driver device 10, the comparator 51 compares the HD-CLK voltage level with the reference voltage VREF and outputs an internal clock signal having voltage levels of, for example, 5 V when HD-CLK exceeds VREF, and 0 V when VREF exceeds HD-CLK. This internal clock signal drives the shift registers in the internal circuitry 52 in each driver device.

Due to the lack of reflection at the ends of the HD-CLK signal line 13B, the HD-CLK signal has an accurate, undistorted waveform. Since the voltage levels of the HD-CLK waveform and the reference voltage VREF are both obtained from the regulated voltage VTT, the result of comparing HD-CLK with VREF is substantially unaffected by LED switching noise on the VDD power supply line. The comparator 51 therefore outputs an accurate internal clock signal, free of transient fluctuations of the type shown in FIG. 5.

Since all driver devices 10 generate their own internal clock signals, there are no propagation delays from one driver device to the next, and the problems of clock skew shown in FIG. 6 are avoided. The flip-flops in the shift registers of all driver devices 10 operate substantially simultaneously. The flip-flop circuits therefore do not need to have a large output delay, and higher clock frequencies become possible than in the prior art. Printing speed can be raised accordingly.

Since the amplitude of the HD-CLK signal is only VTT instead of the conventional VDD (e.g. 1.2 V instead of 5 V), radiation of electromagnetic interference from the interface cable 13 is greatly reduced. The HD-CLK waveform can also be smoothed as shown in FIG. 4, to reduce electromagnetic interference still further. The comparators 51 can generate internal clock signals with sharp rising and falling transitions despite the smoothing of the HD-CLK waveform.

The voltage VTT output by the voltage regulator 55 in the print engine controller 3 is also supplied to the chip compensation circuits 18 in the internal circuitry 52 in the driver devices 10, by signal lines not explicitly shown in FIG. 8. Thus no extra voltage regulator is necessary, as compared with the prior art shown in FIG. 2.

Figure 9:
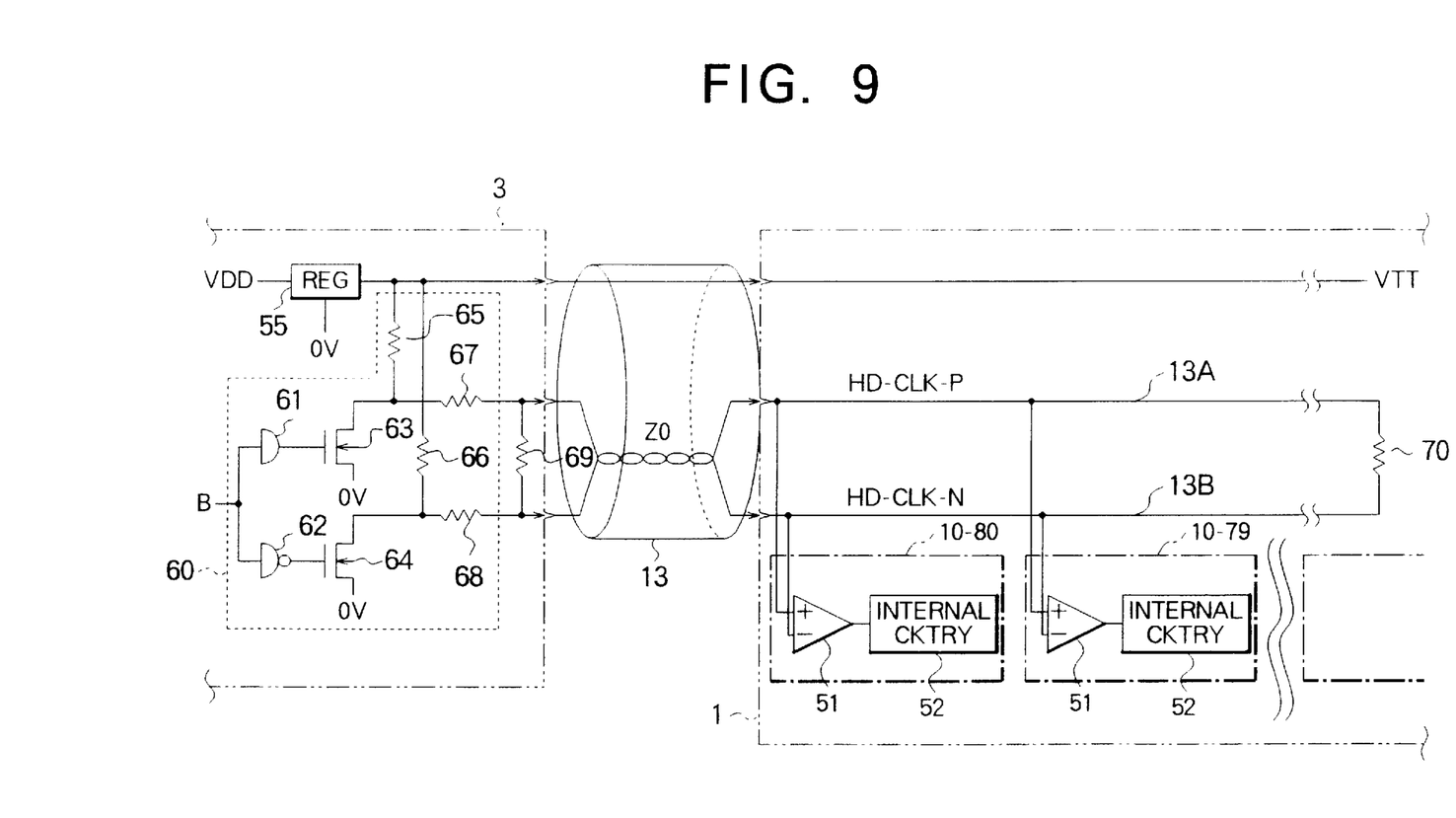
FIG. 9 is a schematic diagram illustrating a second embodiment of the invented signal transfer circuit.

Next a second embodiment of the invention will be described with reference to FIG. 9, using the same reference numerals as in the first embodiment for identical or equivalent elements. The second embodiment requires more components than the first embodiment, but provides a greater reduction in electromagnetic interference.

The second embodiment transmits a complementary pair of clock signals HD-CLK-P and HD-CLK-N from the print engine controller 3 to the printing head 1. The comparators 51 compare HD-CLK-P with HD-CLK-N, producing internal clock signals that go high (e.g. to VDD) when the HD-CLK-P level exceeds the HD-CLK-N level, and go low (e.g. to 0 V) when the HD-CLK-N level exceeds the HD-CLK-P level.

The clock generator 60 that generates the complementary clock signals HD-CLK-P and HD-CLK-N in the print engine controller 3 comprises a buffer circuit 61 and inverter 63, which receive the same source clock signal B and drive the gate electrodes of respective NMOS transistors 63 and 64. The source electrodes of both transistors 63 and 64 are coupled to ground (0 V). The drain electrodes of these transistors are pulled up through respective resistors 65 and 66 to the regulated voltage VTT output by the voltage regulator 55, and are coupled through resistors 67 and 68 to the HD-CLK-P and HD-CLK-N signal lines 13A and 13B.

The HD-CLK-P and HD-CLK-N signal lines 13A and 13B are intertwined to form a twisted pair of signal lines in the interface cable 13. The HD-CLK-P and HD-CLK-N signal lines 13A and 13B are terminated by resistors 69 and 70 in the print engine controller 3 and printing head 1, respectively. Both terminating resistors 69 and 70 have resistance values matched to the characteristic impedance of the twisted pair of signal lines 13A and 13B.

Next the operation of the second embodiment will be described, under the assumption that resistor 65 has the same resistance value as resistor 66, and resistor 67 has the same resistance value as resistor 68.

The outputs of the buffer circuit 61 and inverter 62 are complementary, so only one of the two NMOS transistors 63 and 64 conducts at a time. When transistor 63 conducts, resistors 66, 68, 69, and 67 form a voltage divider between VTT and ground (0 V), setting the level of HD-CLK-N to a certain value $V_H$, while the level of HD-CLK-P is a certain value $V_L$. When transistor 64 conducts, resistors 65, 67, 69, and 68 form a similar voltage divider that sets the level of HD-CLK-P to $V_H$, while the level of HD-CLK-N is $V_L$. The values of $V_H$ and $V_L$ depend on the resistance values of resistors 65, 66, 67, 68, and 69, but satisfy the following relation.

$$0 \text{ V} < V_L < V_H < \text{VTT}$$

In the interface cable 13, the electromagnetic interference generated by HD-CLK-P, radiated from signal line 13A, is complementary to the electromagnetic interference generated by HD-CLK-N, radiated from signal line 13B. The radiated interference thus cancels out. The net electromagnetic interference from the twisted pair of signal lines 13A and 13B is substantially zero.

The amplitude of each of the two complementary clock signals HD-CLK-P and HD-CLK-N is $V_H-V_L$, which is less than the amplitude (VTT) of the external clock signal HD-CLK in the first embodiment. The differential swing seen by the comparators 51 is not necessarily less than in the first embodiment, however. The difference between the two inputs to the comparators 51 is VTT/2 in the first embodiment, and $V_H-V_L$ in the second embodiment. The resistance values of resistors 65, 66, 67, 68, and 69 can be selected to obtain an adequate difference between $V_H$ and $V_L$. As in the first embodiment, due to the impedance-matching terminating resistors 69 and 70, the HD-CLK-P and HD-CLK-N waveforms are free of reflection distortion, and the comparators 51 can generate accurate internal clock signals for use in the internal circuitry 52 of the driver devices 10.

As in the first embodiment, the voltage levels of both inputs to the comparators 51 are generated from the regulated voltage VTT and are substantially free of LED switching noise. Also as in the first embodiment, VTT is supplied to the chip compensation circuits 18 in the internal circuitry 52 of the driver devices 10, so that no extra voltage regulator is required.

The second embodiment thus has the same effects as the first embodiment, but generates even less electromagnetic interference.

The HD-CLK-P and HD-CLK-N signal lines 13A and 13B do not necessarily have to be a twisted pair. Regardless of the way these signals are carried in the interface cable 13, radiated electromagnetic interference can be reduced because of the reduced signal amplitude ($V_H-V_L$) of HD-CLK-P and HD-CLK-N, as compared with the amplitude (VTT) of HD-CLK in the first embodiment, and with the still larger amplitude (VDD) in the prior art.

The preceding embodiments have been described in relation to a printer with a LED-array printing head, but the invention is not restricted to this application. The invented signal transmission circuits can also be used in a thermal printer having an array of heating elements, for example, or in any image output device in which a plurality of driver devices drive a plurality of driven elements of any type according to data received from a control device.

The invention is not restricted to the specific voltage levels mentioned above. The output levels of the comparators 51 can be set to any levels suitable for use in the internal circuitry 52 in the driver devices 10. The regulated voltage level VTT can also be set at any suitable level.

The voltage regulator can be located at either end of the interface cable. In a printer, the voltage regulator can be located in either the print engine controller or the printing head.

The HD-CLK, HD-CLK-P, and HD-CLK-N signals do not have to be generated by on-off switching of NMOS transistors; other types of switching elements can be employed instead.

Those skilled in the art will recognize that further modifications can be made within the scope claimed below.

What is claimed is:

1. A signal transmission circuit for transmitting data from a control device, through an interface cable having a characteristic impedance, to a plurality of driver devices for image output, comprising:
    a clock generator, disposed in said control device, for generating an external clock signal;
    a signal line, coupled to said clock generator, running through said interface cable, and coupled in parallel to said driver devices, for carrying said external clock signal from said clock generator to said driver devices;
    a pair of terminating resistors, each having a resistance value matching said characteristic impedance, coupled to opposite ends of said signal line;
    a voltage regulator coupled to said driver devices, for supplying a reference voltage to said driver devices; and
    a plurality of comparator circuits disposed in respective driver devices, coupled to said voltage regulator and said signal line, for comparing said external clock signal with said reference voltage, thereby generating internal clock signals for use in receiving said data in respective driver devices.

2. The signal transmission circuit of claim 1, wherein said driver devices are disposed in a printing head of a printer.

3. The signal transmission circuit of claim 2, wherein said voltage regulator is disposed in said printing head.

4. The signal transmission circuit of claim 1, wherein said voltage regulator is disposed in said control device.

5. The signal transmission circuit of claim 1, wherein said voltage regulator generates a regulated voltage, and said reference voltage is produced by dividing said regulated voltage.

6. The signal transmission circuit of claim 5, wherein said clock generator comprises a switching element that receives said regulated voltage through one terminating resistor among said pair of terminating resistors.

7. The signal transmission circuit of claim 5, wherein:
    said driver devices supply current to respective driven elements;
    said driver devices have respective compensation circuits for adjusting said current; and
    said regulated voltage is also supplied to the compensation circuits in said driver devices.

8. The signal transmission circuit of claim 1, wherein said external clock signal has a first amplitude, and said internal clock signals have a second amplitude exceeding said first amplitude.

9. The signal transmission circuit of claim 1, wherein said driver devices are cascaded to form a shift register, and said data are shifted in series through said driver devices in synchronization with the internal clock signals generated in said driver devices.

10. A signal transmission circuit for transmitting data from a control device, through an interface cable having a characteristic impedance, to a plurality of driver devices for image output, comprising:
    a clock generator, disposed in said control device, for generating a pair of complementary clock signals;
    a pair of signal lines, coupled to said clock generator, running through said interface cable, and coupled in parallel to said driver devices, for carrying said pair of complementary clock signals from said clock generator to said driver devices;
    a pair of terminating resistors, each having a resistance value matching said characteristic impedance, coupled to said pair of signal lines at opposite ends of said pair of signal lines; and
    a plurality of comparator circuits disposed in respective driver devices, coupled to said pair of signal lines, for comparing said pair of complementary clock signals and thereby generating internal clock signals for use in receiving said data in respective driver devices.

11. The signal transmission circuit of claim 10, wherein said driver devices are disposed in a printing head of a printer.

12. The signal transmission circuit of claim 10, wherein said pair of complementary clock signals have a first amplitude, and said internal clock signals have a second amplitude exceeding said first amplitude.

13. The signal transmission circuit of claim 10, further comprising a voltage regulator that supplies a regulated voltage to said clock generator, wherein said clock generator generates said pair of complementary clock signals from said regulated voltage.

14. The signal transmission circuit of claim 13, wherein said clock generator comprises:
    a pair of switching elements;
    a first pair of voltage-dividing resistors coupling respective switching elements to said voltage regulator; and
    a second pair of voltage-dividing resistors coupling respective switching elements to said pair of signal lines.

15. The signal transmission circuit of claim 13, wherein:

said driver devices supply current to respective driven elements;

said driver devices have respective compensation circuits for adjusting said current; and said regulated voltage is also supplied to the compensation circuits in said driver devices.

16. The signal transmission circuit of claim 10, wherein said driver devices are cascaded to form a shift register, and said data are shifted in series through said driver devices in synchronization with the internal clock signals generated in said driver devices.

17. A method of transmitting data from a control device, through an interface cable having a characteristic impedance, to a plurality of driver devices for use in image output, comprising the steps of:

generating a regulated voltage;

transmitting said regulated voltage through said interface cable;

supplying said regulated voltage through a first resistor, having a resistance value matched to said characteristic impedance, to a first switching element in said control device;

generating a first signal by switching said first switching element on and off;

supplying said first signal through said interface cable to all of said driver devices in parallel;

generating a second signal from said regulated voltage;

supplying said second signal to all of said driver devices;

comparing said first signal and said second signal in each of said driver devices, thereby separately generating, in each of said driver devices, a clock signal with transitions responsive to relative levels of said first signal and said second signal; and receiving said data in each of said control devices in synchronization with the clock signal thus generated.

18. The method of claim 17, wherein said second signal has a constant level.

19. The method of claim 18, wherein said step of generating a second signal comprises dividing said regulated voltage.

20. The method of claim 17, wherein said second signal is complementary to said first signal.

21. The method of claim 20, wherein said step of generating said second signal comprises the further steps of:

supplying said regulated voltage to a second switching element; and switching said second switching element on and off.

22. The method of claim 17, wherein said driver devices are disposed in a printing head in a printer.

23. The method of claim 17, wherein said driver devices supply current to respective driven elements and said driver devices have respective compensation circuits for adjusting said current, comprising the further step of:

supplying said regulated voltage to the compensation circuits in said driver devices.

24. The method of claim 17, wherein said first signal has a first amplitude, and said clock signal has a second amplitude exceeding said first amplitude.

25. The method of claim 17, wherein said driver devices are cascaded to form a shift register, and said data are shifted in series through said driver devices in synchronization with the clock signal generated in each driver device.

* * * * *